(12) United States Patent
Saitou et al.

(10) Patent No.: US 8,202,186 B2
(45) Date of Patent: Jun. 19, 2012

(54) HYDRAULIC CONTROL APPARATUS FOR AUTOMATIC TRANSMISSION

(75) Inventors: Yuuji Saitou, Fujinomiya (JP); Goh Endo, Yokohama (JP); Osamu Sato, Fujisawa (JP)

(73) Assignee: Jatco Ltd, Fuji-shi (JP)

( * ) Notice: Subject to any disclaimer, the term of this patent is extended or adjusted under 35 U.S.C. 154(b) by 579 days.

(21) Appl. No.: 12/480,968

(22) Filed: Jun. 9, 2009

(65) Prior Publication Data

US 2009/0312132 A1 Dec. 17, 2009

(30) Foreign Application Priority Data

Jun. 11, 2008 (JP) .................................. 2008-152365

(51) Int. Cl.
*F16H 31/00* (2006.01)
(52) U.S. Cl. ........................................................ 475/128
(58) Field of Classification Search .................. 475/116, 475/127–136
See application file for complete search history.

(56) References Cited

U.S. PATENT DOCUMENTS

| | | | |
|---|---|---|---|
| 6,102,830 A | 8/2000 | Tsutsui et al. | |
| 7,261,662 B2 * | 8/2007 | Nozaki et al. | 475/119 |
| 7,740,559 B2 * | 6/2010 | Ayabe et al. | 477/102 |
| 2006/0172856 A1 * | 8/2006 | Takagi | 477/127 |

FOREIGN PATENT DOCUMENTS

| | | |
|---|---|---|
| EP | 1 096 178 A2 | 5/2001 |
| EP | 1 801 466 A2 | 6/2007 |
| JP | 4-060271 A | 2/1992 |
| JP | 9-273627 A | 10/1997 |

* cited by examiner

*Primary Examiner* — Justin Holmes
(74) *Attorney, Agent, or Firm* — Foley & Lardner LLP

(57) ABSTRACT

A hydraulic control apparatus for an automatic transmission, including a sequential shift control means for performing sequential shift control in a case where it is necessary to execute the second shift during execution of the first shift. The sequential shift control includes starting reduction of hydraulic fluid pressure in the third friction element when a parameter that varies in accordance with a degree of progress of the first shift has reached a predetermined value, and performing piston stroke control that includes outputting a high hydraulic pressure command as a hydraulic fluid pressure to the second friction element when the selector valve is switched from the second position to the first position, and subsequent to completion of outputting of the high hydraulic pressure command, outputting a low hydraulic pressure command that is lower than the high hydraulic pressure command.

10 Claims, 8 Drawing Sheets

FIG.1
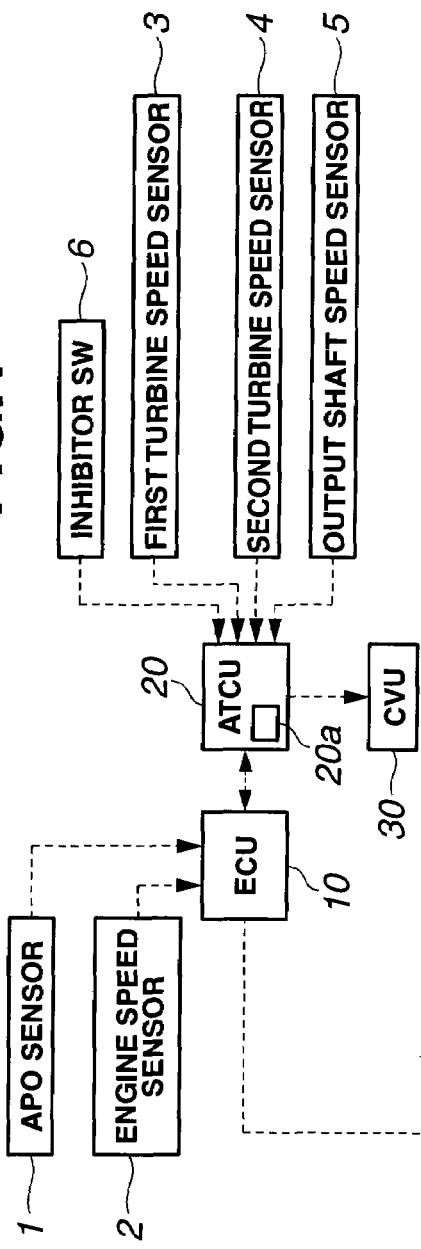
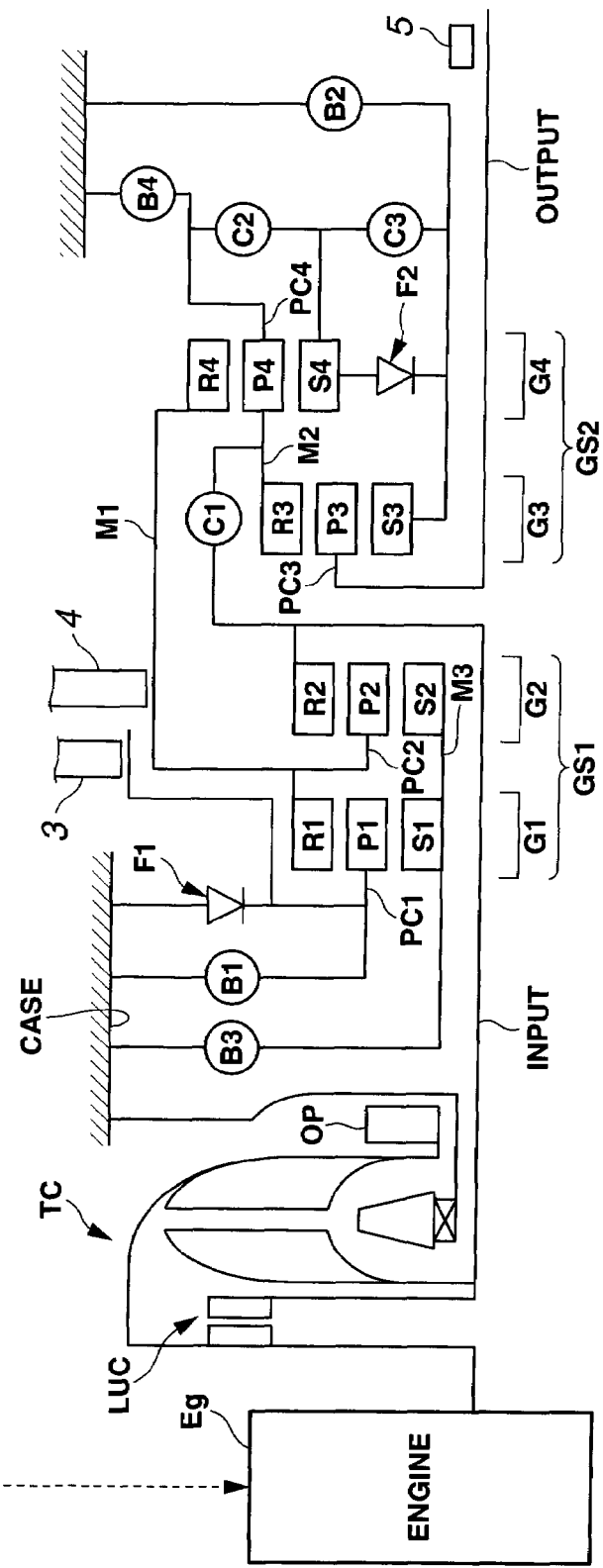

FIG.2

|  | B1<br>Fr/B | C1<br>I/C | C2<br>D/C | C3<br>H&RL/C | B2<br>LOW/B | B3<br>2346/B | B4<br>R/B | F1 | F2 |
|---|---|---|---|---|---|---|---|---|---|
| 1ST | (○) |  |  | (○) | ○ |  |  | ○ | ○ |
| 2ND |  |  |  | (○) | ○ | ○ |  |  | ○ |
| 3RD |  |  | ○ |  | ○ | ○ |  |  |  |
| 4TH |  |  | ○ | ○ |  | ○ |  |  |  |
| 5TH |  | ○ | ○ | ○ |  |  |  |  |  |
| 6TH |  | ○ |  | ○ |  | ○ |  |  |  |
| 7TH | ○ | ○ |  | ○ |  |  |  | ○ |  |
| REV. | ○ |  |  | ○ |  |  | ○ |  |  |

HYDRAULIC CONTROL APPARATUS FOR AUTOMATIC TRANSMISSION

BACKGROUND OF THE INVENTION

The present invention relates to a hydraulic control apparatus for an automatic transmission which controls a gear ratio on the basis of a vehicle speed estimating value after a predetermined elapsed time.

Conventionally, there has occurred the following problem in the art. When a second shift is determined during performing a first shift, that is, when a first shift and a second shift are sequentially performed (hereinafter referred to as sequential shift), it takes a long time until a final speed is achieved if the second shift is performed after termination of the first shift. In order to solve this problem, there has been proposed Japanese Patent Application First Publication No. 9-273627 that discloses a control apparatus for an automatic transmission. Immediately after the second shift is determined during performing the first shift, the controller outputs a hydraulic command to bring a friction element into engagement upon the second shift, and the second shift is started after a predetermined time elapsed from the output of the hydraulic command on the assumption that a piston stroke of the friction element is accomplished.

In addition, Japanese Patent Application First Publication No. 4-60271 discloses a hydraulic control apparatus for a transmission that is adapted to suppress occurrence of interlock between a first friction element and a second friction element upon simultaneous engagement thereof. The hydraulic control apparatus includes a selector valve in a hydraulic circuit for the second friction element that causes rapid reduction when brought into engagement simultaneously with the first friction element. The selector valve is operative to block supply of a working oil to the second friction element when the first friction element is in the engagement state.

SUMMARY OF THE INVENTION

In a case where the control of Japanese Patent Application First Publication No. 9-273627 is applied to the hydraulic control apparatus of Japanese Patent Application First Publication No. 4-60271 to perform the sequential shift in view of reducing the shift time, there may occur a delay of hydraulic pressure rise in the friction element on the engagement side with respect to hydraulic pressure drop in the friction element on the release (or disengagement) side to thereby cause engine idle revving. That is, immediately after determination of the sequential shift, a hydraulic command is outputted to the second friction element (LOW/B) that serves as the engagement side friction element upon the following shift, and after a predetermined time elapsed from the output of the hydraulic command, the friction element on the release side is released.

However, if the determination of the sequential shift is performed at an initial stage of an inertia phase, changeover of the selector valve is not carried out until the hydraulic pressure in the first friction element is lowered, so that a pressure regulator valve for the second friction element is not supplied with a source pressure even when a predetermined time has elapsed. An actual piston stroke of the second friction element is not carried out even when a predetermined time is elapsed from output of an engagement command for the second friction element. As a result, the friction element on the engagement side is not supplied with the hydraulic pressure, although a hydraulic pressure drop in the friction element on the release side proceeds. There will occur a delay of hydraulic pressure rise in the friction element on the engagement side with respect to the friction element on the release side, thereby causing engine idle revving and shift shock due to rapid hydraulic pressure drop following the engine idle revving after an inertia phase upon the following shift is terminated.

To solve the above problem, it might be considered that after changeover of the selector valve is carried out, release of a release-side element and engagement of an engagement-side element (the second friction element) for the following shift may be started. However, if the following shift is performed after carrying out the changeover of the selector valve, there occurs such a problem that the final speed can be accomplished only with delay.

It is an object of the present invention to provide a hydraulic control apparatus for an automatic transmission which is capable of performing sequential shift without engine idle revving and reducing a time required until a final speed (i.e., a final gear stage) is achieved by using a selector valve that is disposed in a hydraulic supply passage to a friction element engageable in the following shift and performs changeover in response to an operating pressure of a friction element on a release side in the previous shift.

In one aspect of the present invention, there is provided a hydraulic control apparatus for an automatic transmission that includes a planetary gear set and a plurality of friction elements and establishes a plurality of speeds by changeover of the plurality of friction elements between engagement and release, the plurality of friction elements including a first friction element that is brought into a release state upon first shift, a second friction element that is in a release state upon the first shift but is brought into an engagement state upon second shift, and a third friction element that is brought into a release state upon the second shift, the hydraulic control apparatus comprising:

a pressure regulator valve regulating a hydraulic fluid pressure that is supplied to the second friction element;

a selector valve that is switchable between a first position where fluid communication between the pressure regulator valve and the second friction element is allowed, and a second position where the fluid communication between the pressure regulator valve and the second friction element is blocked;

a switch means for switching the selector valve to the second position when the first friction element is in the engagement state, and switching the selector valve to the first position when the first friction element is in the release state; and a sequential shift control means for performing sequential shift control in a case where it is necessary to execute the second shift during execution of the first shift, the sequential shift control including:

starting reduction of hydraulic fluid pressure in the third friction element when a parameter that varies in accordance with a degree of progress of the first shift has reached a predetermined value, and performing piston stroke control that includes outputting a high hydraulic pressure command as a hydraulic fluid pressure to the second friction element when the selector valve is switched from the second position to the first position, and subsequent to completion of outputting of the high hydraulic pressure command, outputting a low hydraulic pressure command that is lower than the high hydraulic pressure command.

In a further aspect of the present invention, there is provided a method of controlling an automatic transmission that includes a planetary gear set, a plurality of friction elements and establishes a plurality of speeds by changeover of the plurality of friction elements between engagement and release, the plurality of friction elements including a first friction element that is brought into a release state upon first shift, a second friction element that is in a release state upon the first shift and is brought into an engagement state upon second shift, and a third friction element that is brought into a release state upon the second shift, a pressure regulator valve regulating a hydraulic fluid pressure that is supplied to the second friction element, a selector valve that is switchable between a first position where fluid communication between the pressure regulator valve and the second friction element is allowed, and a second position where the fluid communication between the pressure regulator valve and the second friction element is blocked, and a switch means for switching the selector valve to the second position when the first friction element is in the engagement state, and switching the selector valve to the first position when the first friction element is in the release state, the method comprising:

in a case where it is necessary to execute the second shift during execution of the first shift, starting reduction of hydraulic fluid pressure in the third friction element when a parameter that varies in accordance with a degree of progress of the first shift has reached a predetermined value;

outputting a high hydraulic pressure command as a hydraulic fluid pressure to the second friction element when the selector valve is switched from the second position to the first position; and subsequent to completion of outputting of the high hydraulic pressure command, outputting a low hydraulic pressure command that is lower than the high hydraulic pressure command.

BRIEF DESCRIPTION OF THE DRAWINGS

FIG. 1 is a skeleton diagram showing a construction of an automatic transmission to which a hydraulic control apparatus according to an embodiment of the present invention is applicable.

FIG. 2 is a table showing engagement states of friction elements of the automatic transmission shown in FIG. 1 to achieve seven forward speeds and one reverse speed.

DETAILED DESCRIPTION OF THE INVENTION

Figure 3:
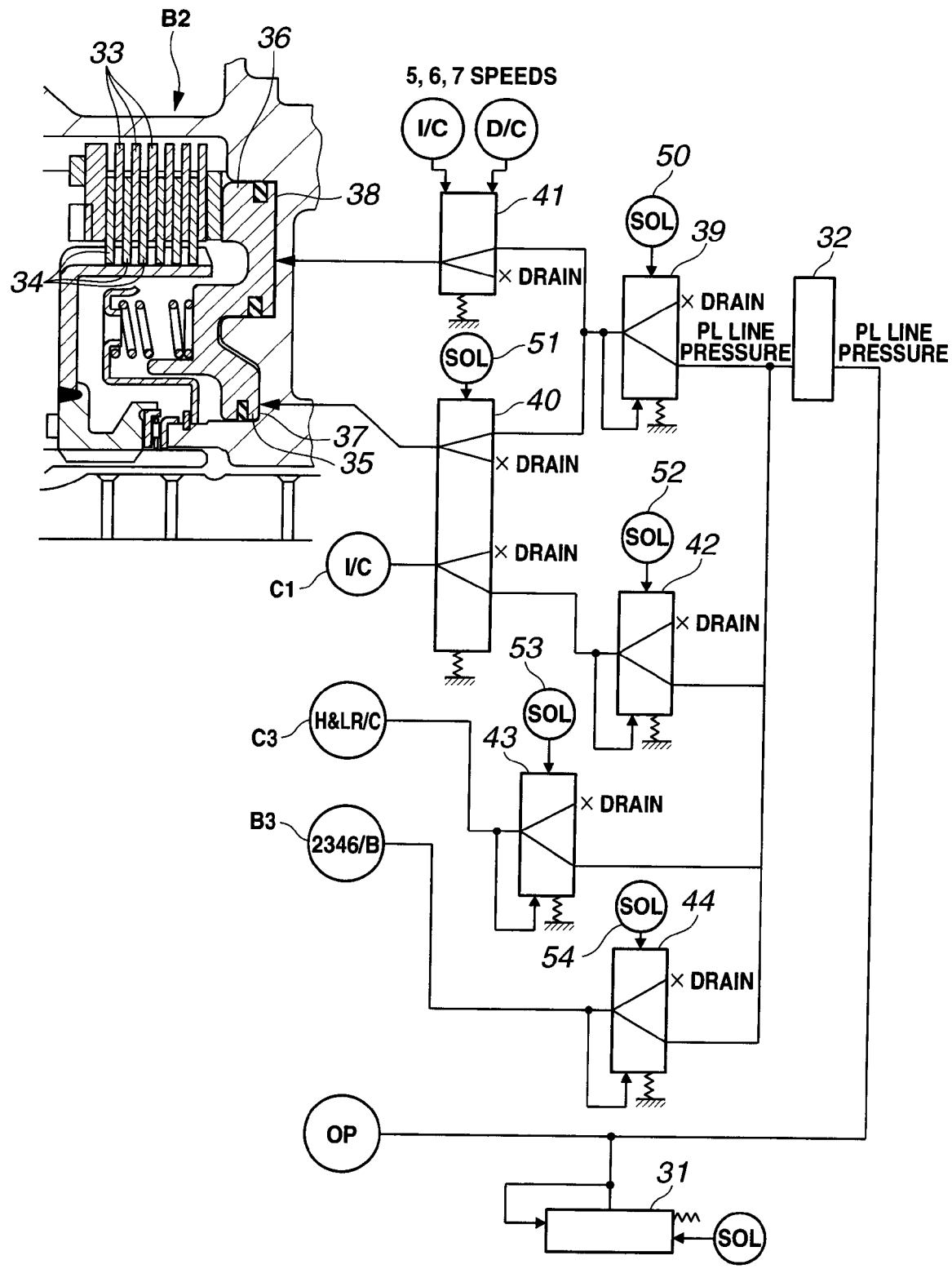
FIG. 3 is a circuit diagram showing a hydraulic circuit of a control valve unit of the hydraulic control apparatus of the embodiment.

Referring to FIGS. 1-9, a hydraulic control apparatus for an automatic transmission, according to an embodiment of the present invention, is explained. FIG. 1 shows a construction of a stepped automatic transmission with seven forward speeds 1st-7th and one reverse Rev. to which the apparatus of the embodiment is applicable. Output rotation, i.e., driving force, of engine Eg is transmitted through torque converter TC to input shaft Input of the automatic transmission. The rotational speed of input shaft Input is changed by four planetary-gear sets and seven friction elements (or engaging elements) and then outputted via output shaft Output. Oil pump OP is disposed coaxially with a pump impeller of torque converter TC and rotatably driven to pressurize a working oil by the driving force of engine Eg.

The automatic transmission includes engine controller (ECU) 10 that controls a driving state of engine Eg, automatic transmission controller (ATCU) 20 that controls a shift state of the automatic transmission, and control valve unit (CVU) 30 that controls a hydraulic pressure (or a hydraulic fluid pressure) in the respective friction elements on the basis of an output signal from ATCU 20. CVU 30 serves as a sequential shift control unit that performs sequential shift control as explained later. ECU 10 and ATCU 20 are connected to each other through CAN (computer area network) communication line and share sensor information and control information by the intercommunication.

APO sensor 1 that detects accelerator pedal operating amount APO operated by a vehicle driver, and engine speed sensor 2 that detects a rotational speed of engine Eg are connected to ECU 10. ECU 10 controls a fuel injection quantity and a throttle opening on the basis of the engine rotational speed detected and the accelerator pedal operating amount detected, and controls engine output speed and engine torque.

First turbine-speed sensor 3 that detects rotational speed of first carrier PC1, second turbine-speed sensor 4 that detects rotational speed of first ring gear R1, and output shaft speed sensor 5 that detects rotational speed of output shaft Output, are connected to ATCU 20. Further, inhibitor switch 6 that detects an operating state of a shift lever that is operated by the vehicle driver is connected to ATCU 20. ATCU 20 selects an optimal command speed (i.e., an optimal command gear stage) in a D-range position of the shift lever on the basis of vehicle speed Vsp and accelerator pedal operating amount APO, and outputs a control command to achieve the command speed to CVU 30. ATCU 20 includes hydraulic pressure determination section 20a.

A gear train between input shaft Input and output shaft Output is explained. First planetary gear arrangement GS1 and second planetary gear arrangement GS2 are arranged in sequence from a side of input shaft Input toward a side of output shaft Output. A plurality of clutches C1, C2 and C3 and a plurality of brakes B1, B2, B3 and B4 which serve as friction elements, are arranged. Further, a plurality of one-way clutches F1 and F2 are arranged.

First planetary gear arrangement GS1 includes first planetary gear set G1 and second planetary gear set G2. First planetary gear set G1 is a single-pinion planetary gear set, including first sun gear S1, first ring gear R1, and first planet-pinion carrier PC1 carrying first planet pinion set P1 that is in meshing contact with first sun gear S1 and with first ring gear R1. Second planetary gear set G2 is a single-pinion planetary gear set, including second sun gear S2, second ring gear R2, and second planet-pinion carrier PC2 carrying second planet pinion set P2 that is in meshing contact with second sun gear S2 and with second ring gear R2. Second planetary gear arrangement GS2 includes third planetary gear set G3 and fourth planetary gear set G4. Third planetary gear set G3 is a single-pinion planetary gear set, including third sun gear S3, third ring gear R3, and third planet-pinion carrier PC3 carrying third planet pinion set P3 that is in meshing contact with third sun gear S3 and with third ring gear R3. Fourth planetary gear set G4 is a single-pinion planetary gear set, including fourth sun gear S4, fourth ring gear R4, and fourth planet-pinion carrier PC4 carrying fourth planet pinion set P4 that is in meshing contact with fourth sun gear S4 and with fourth ring gear R4.

Input shaft Input is drivingly connected to second ring gear R2 to transmit a driving torque from engine Eg to second ring gear R2 via torque converter TC. Output shaft OUTPUT is drivingly connected to third planet-pinion carrier PC3 to transmit output driving torque from third planet-pinion carrier PC3 to a drive wheel set (not shown) via a final gear (not shown).

First connection member M1 connects first ring gear R1, second planet-pinion carrier PC2 and fourth ring gear R4 to thereby allow unitary rotation thereof. Second connection member M2 connects third ring gear R3 and fourth planet-pinion carrier PC4 to thereby allow unitary rotation thereof. Third connection member M3 connects first sun gear S1 and second sun gear S2 to thereby allow set rotation thereof.

First planetary gear arrangement GS1 is formed by connecting first planetary gear set G1 and second planetary gear set G2 through first connection member M1 and third connection member M3, and thus constituted of four rotational elements. Second planetary gear arrangement GS2 is formed by connecting third planetary gear set G3 and fourth planetary gear set G4 through second connection member M2, and thus constituted of five rotational elements.

First planetary gear arrangement GS1 has an input torque path that allows torque to be inputted from input shaft Input to second ring gear R2. The torque inputted to second ring gear R2 is outputted to second planetary gear arrangement GS2 through first connection member M1. Second planetary gear arrangement GS2 has an input torque path that allows torque to be directly inputted from input shaft Input to second connection member M2, and another input torque path that allows torque to be inputted from first connection member M1 to fourth ring gear R4. The torque inputted fourth ring gear R4 is outputted from third planet-pinion carrier PC3 to output shaft Output.

Input clutch C1 is disposed between the input shaft Input and second connection member M2 so as to selectively allow connection therebetween and prevent the connection therebetween. Direct clutch C2 is disposed between fourth sun gear S4 and fourth planet-pinion carrier PC4 so as to selectively allow connection therebetween and prevent the connection therebetween.

H&RL clutch C3 is disposed between third sun gear S3 and fourth sun gear S4 so as to selectively allow connection therebetween and prevent the connection therebetween. Second one-way clutch F2 is disposed between third sun gear S3 and fourth sun gear S4. When H&RL clutch C3 is in a disengagement (or release) state and the rotational speed of fourth sun gear S4 is higher than the rotational speed of third sun gear S3, third sun gear S3 and fourth sun gear S4 have independent rotational speeds. Therefore, third and fourth planetary gear sets G3 and G4 connected through second connection member M2 are arranged to achieve independent gear ratios.

Front brake B1 is disposed between first planet-pinion carrier PC1 and a stationary transmission case so as to selectively stop and allow rotation of first planet-pinion carrier PC1. First one-way clutch F1 is arranged in parallel to front brake B1. Low brake B2 is disposed between third sun gear S3 and the transmission case so as to selectively stop and allow rotation of third sun gear S3. 2346-brake B3 is disposed between the transmission case and third connection member M3 that rotates first sun gear S1 and second sun gear S2. 2346-brake B3 is arranged to selectively stop and allow rotation of third connection member M3 (first sun gear S1 and second sun gear S2). Reverse brake B4 is disposed between fourth planet-pinion carrier PC4 and the transmission case so as to selectively stop and allow rotation of fourth planet-pinion carrier PC4.

The gear train having the above-described construction can achieve a desired speed among seven forward speeds 1st-7th and one reverse REV by conducting changeover between engagement and release (or disengagement) of the respective friction elements as shown in an engagement table of FIG. 2. In the table shown in FIG. 2, a cell with symbol of circle denotes engagement of the friction element, a cell with no symbol denotes release of the friction element, and a cell with symbol of parenthesized circle denotes engagement of the friction element which is carried out when selecting a range position where engine braking is operated.

Specifically, first speed 1st is achieved by engaging low brake B2, first one-way clutch F1 and second one-way clutch F2. Second speed 2nd is achieved by engaging low brake B2, 2346-brake B3 and second one-way clutch F2. Third speed 3rd is achieved by engaging low brake B2, 2346-brake B3 and direct clutch C2, in which first one-way clutch F1 and second one-way clutch F2 are released. Fourth speed 4th is achieved by engaging 2346-brake B3, direct clutch C2 and H&RL clutch C3. Fifth speed 5th is achieved by engaging input clutch C1, direct clutch C2 and H&RL clutch C3. Sixth speed 6th is achieved by engaging 2346-brake B3, input clutch C1 and H&RL clutch C3. Seventh speed 7th is achieved by engaging front brake B1, input clutch C1, H&RL clutch C3 and first one-way clutch F1. Reverse speed Rev. is achieved by engaging reverse brake B4, front brake B1 and H&RL clutch C3.

Referring to FIG. 3, a hydraulic circuit of CVU 30 which serves for supplying hydraulic pressure to low brake B2, input clutch C1, H&RL clutch C3 and 2346-brake B3 is explained hereinafter.

CVU 30 includes oil pump OP, pressure regulator valve 31 that regulates line pressure PL, and manual valve 32 that conducts changeover between hydraulic supply passages to the respective friction elements. A discharge pressure from oil pump OP is regulated according to an opening of a drain port of pressure regulator valve 31 and used as line pressure PL. Line pressure PL is supplied to the respective friction elements through the hydraulic supply passage changed by manual valve 32.

Low brake B2 is brought into a frictional engagement state by pressing a set of first friction plates 33 and a set of second friction plates 34 by biasing force of first and second pistons 35 and 36. First piston 35 having a small pressure-receiving area is integrally formed with second piston 36 having a large pressure-receiving area. With this construction of low brake B2, first hydraulic chamber 37 serving for applying hydraulic pressure to first piston 35, and second hydraulic chamber 38 serving for applying hydraulic pressure to second piston 36 are independently supplied with the hydraulic pressure. A total biasing force of first piston 35 and second piston 36 which provides an engagement capacity of low brake B2 is given by a sum of the product of the pressure-receiving area of first piston 35 and the hydraulic pressure that is received by first piston 35 and the product of the pressure-receiving area of second piston 36 and the hydraulic pressure that is received by second piston 36.

The hydraulic circuit to low brake B2 includes pressure regulator valve 39 that regulates hydraulic pressure to be supplied to low brake B2, and first selector valve 40 that opens and closes a hydraulic supply passage to first hydraulic chamber 37, and second selector valve 41 that opens and closes a hydraulic supply passage to second hydraulic chamber 38.

The opening of pressure regulator valve 39 is controlled in response to an operating amount of linear solenoid 50. First selector valve 40 is switchable between a first position and a second position in response to a signal pressure of ON/OFF solenoid 51. In the first position, first selector valve 40 establishes fluid communication between pressure regulator valve 39 and first hydraulic chamber 37 and fluid communication between a hydraulic chamber of input clutch C1 and a drain port. In the second position, first selector valve 40 blocks the fluid communication between pressure regulator valve 39 and first hydraulic chamber 37 and establishes fluid communication between first hydraulic chamber 37 and a drain port and fluid communication between the hydraulic chamber of input clutch C1 and pressure regulator valve 42. ON/OFF solenoid 51 is placed in the OFF position while the hydraulic pressure in input clutch C1 is present (i.e., under the condition that a hydraulic pressure command to input clutch C1 is outputted), and placed in the ON position when a hydraulic pressure command to input clutch C1 is zero.

Second selector valve 41 is switchable between a first position and a second position in response to a hydraulic pressure as a signal pressure which is supplied to input clutch C1 and direct clutch C2. In the first position, second selector valve 41 establishes fluid communication between pressure regulator valve 39 and second hydraulic chamber 38 when the hydraulic pressure is not supplied to input clutch C1 and direct clutch C2. In the second position, second selector valve 41 blocks the fluid communication between pressure regulator valve 39 and second hydraulic chamber 38 when the hydraulic pressure is supplied to input clutch C1 or direct clutch C2.

Similarly, the hydraulic circuit to input clutch C1, H&RL clutch C3 and 2346-brake B3 includes pressure regulator valves 42, 43 and 44 which regulates the hydraulic pressure to be supplied to the respective friction elements and linear solenoids 52, 53 and 54 which control the openings of pressure regulator valves 42, 43 and 44, respectively.

Line pressure PL supplied from manual valve 32 to the hydraulic circuit to low brake B2 is regulated by regulator valve 39 and given as a low-brake operating hydraulic pressure. When both first selector valve 40 and second selector valve 41 are placed in the second position, the low-brake operating hydraulic pressure is not supplied to low brake B2. On the other hand, when one of first selector valve 40 and second selector valve 41 is placed in the first position, the low-brake operating hydraulic pressure is supplied to first hydraulic chamber 37 or second hydraulic chamber 38 of low brake B2 via the one of first selector valve 40 and second selector valve 41 which is placed in the first position. When both first selector valve 40 and second selector valve 41 are placed in the first position, the low-brake operating hydraulic pressure is supplied to both first hydraulic chamber 37 and second hydraulic chamber 38.

As shown in the engagement table of FIG. 2, low brake B2 is in the engagement state at first speed 1st to third speed 3rd. Since a torque ratio (i.e., a torque shared in a case where an input torque is 1) is large at first speed 1st and second speed 2nd, it is necessary to produce larger engagement capacity between first friction plate 33 and second friction plate 34. Therefore, both first selector valve 40 and second selector valve 41 are controlled so as to be placed in the respective first position thereof. In contrast, the torque ratio is relatively small at third speed 3rd. Therefore, it is not necessary to produce large engagement capacity between first friction plate 33 and second friction plate 34. In this case, first selector valve 40 is controlled so as to be placed in the first position thereof, and second selector valve 41 is controlled so as to be placed in the second position thereof.

In the thus constructed automatic transmission, when input clutch C1 and low brake B2 are simultaneously brought into the engagement state upon downshift, for instance, from fourth speed 4th to third speed 3rd, the vehicle undergoes abrupt deceleration G due to occurrence of interlock. For this reason, input clutch C1 and low brake B2 are prevented from simultaneously coming into the engagement state by controlling first and second selector valves 40 and 41.

[Normal Downshift Control Operation]

Figure 4:
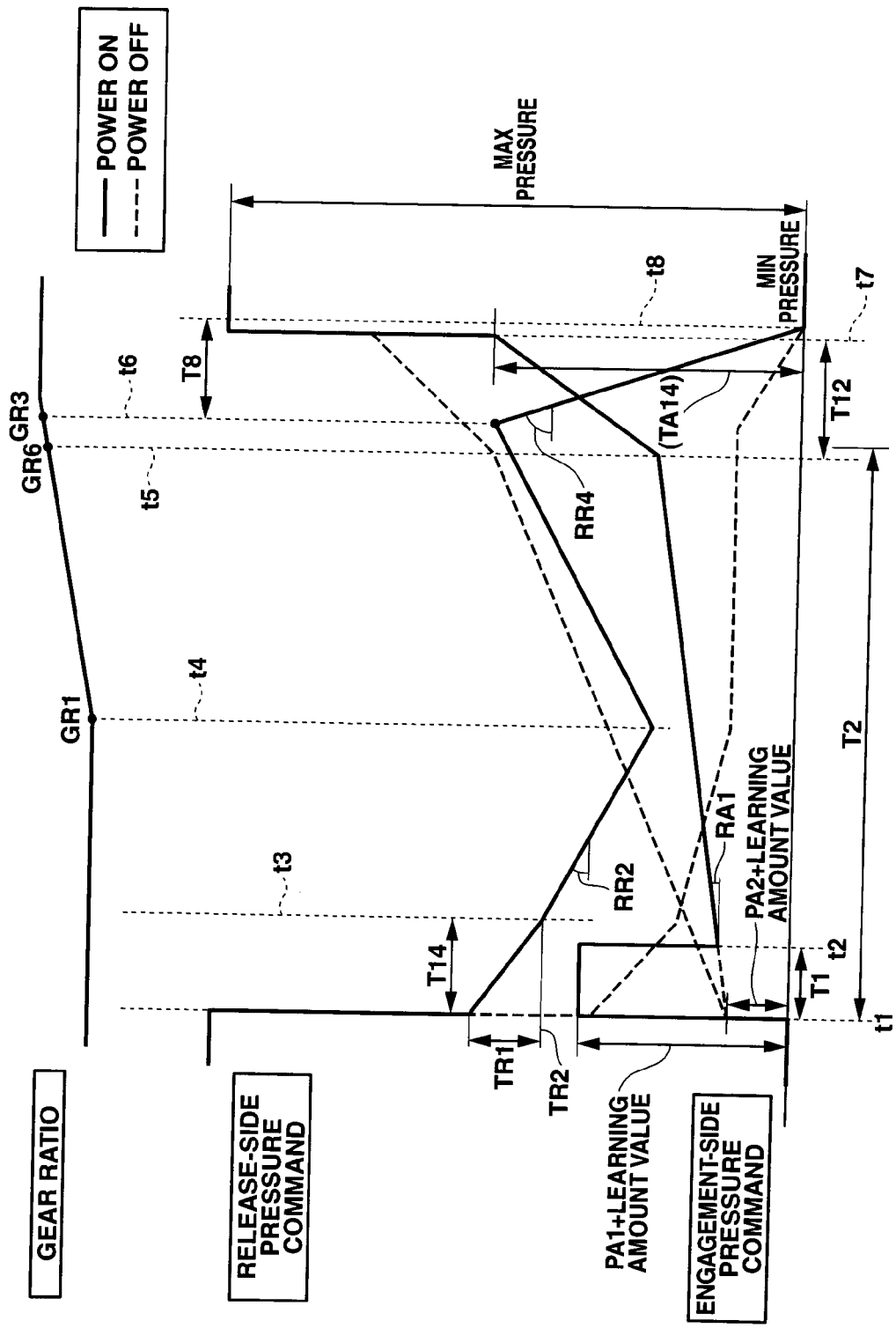
FIG. 4 is a time chart showing a normal downshift control operation in the embodiment.
Figure 5:
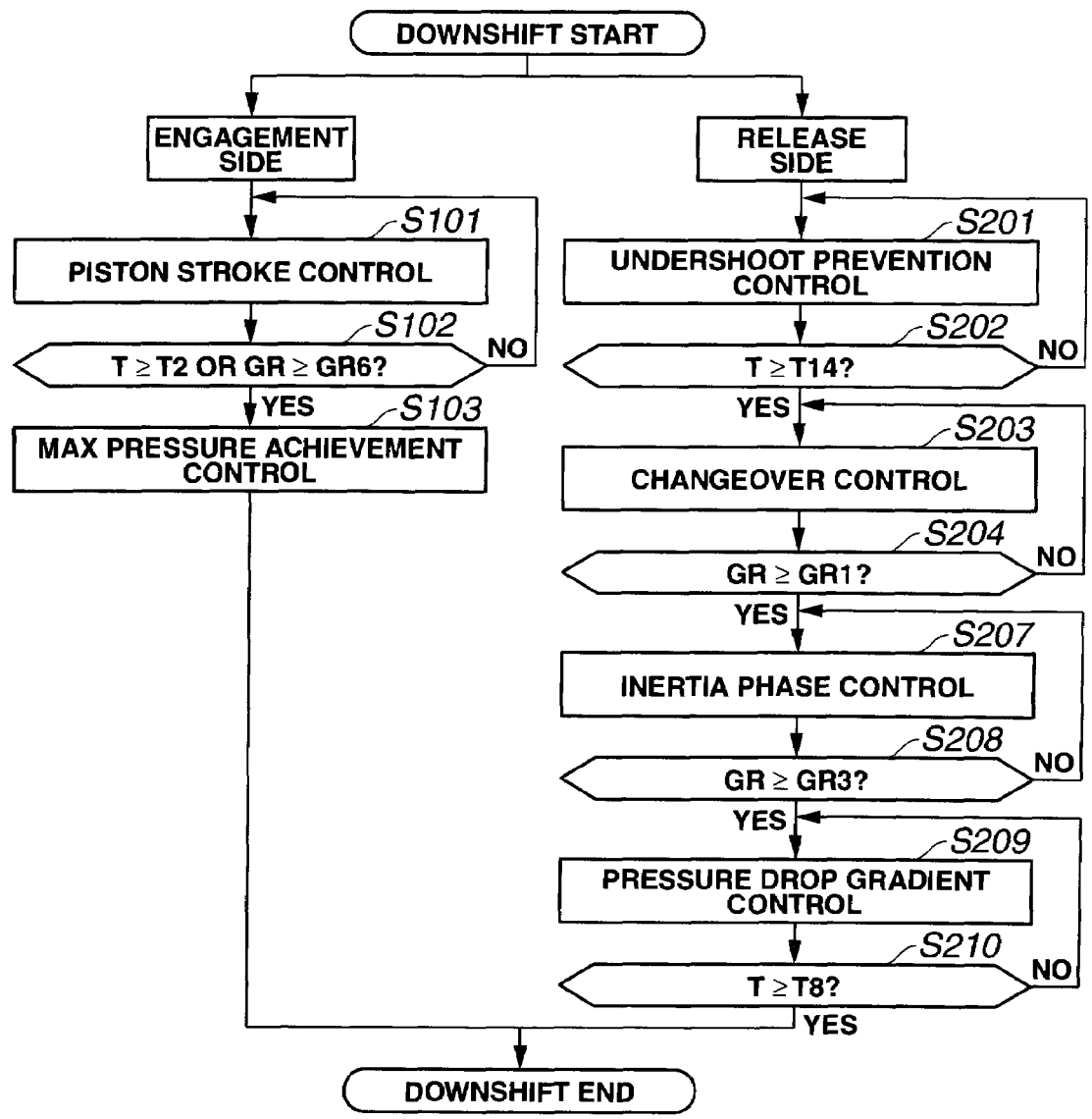
FIG. 5 is a flowchart showing the normal downshift control operation in the embodiment.

Referring to FIG. 4 and FIG. 5, downshift control is explained. FIG. 4 is a time chart showing a normal downshift control operation in this embodiment, and FIG. 5 is a flowchart showing the normal downshift control operation in this embodiment.

When a target speed is set to n−1 speed on the basis of a shift map stored in ATCU 20 upon change in running condition of the vehicle during the running of the vehicle, downshift from n speed to n−1 speed is started on the basis of a control signal from ATCU 20.

When the downshift from n speed to n−1 speed is started, piston stroke control for the engagement-side friction element is conduced during a time period from time t1 to t5 as shown in FIG. 4 (step S101 in FIG. 5). The piston stroke control is carried out by a first hydraulic pressure value transmitting section that outputs a low hydraulic pressure value as a hydraulic pressure command to hydraulic pressure determination section 20a, and a second hydraulic pressure value transmitting section that outputs a high hydraulic pressure value as a hydraulic pressure command to hydraulic pressure determination section 20a.

The first hydraulic pressure value transmitting section and the second hydraulic pressure value transmitting section perform calculation of a hydraulic pressure value independently of each other. When solenoid 51 is in the ON position, hydraulic pressure determination section 20a determines either one of the first hydraulic pressure value outputted by the first hydraulic pressure value transmitting section and the second hydraulic pressure value outputted by the second hydraulic pressure value transmitting section which is higher than the other, as a final hydraulic pressure command and outputted to solenoid 50. Hydraulic pressure determination section 20a serves as a hydraulic pressure control section. Ordinarily, the first hydraulic pressure value transmitting section and the second hydraulic pressure value transmitting section respectively start to output the hydraulic pressure value simultaneously with the output of the downshift command. After predetermined time period T1 as explained later has elapsed, only the first hydraulic pressure value transmitting section outputs the hydraulic pressure value.

The second hydraulic pressure value transmitting section outputs such a high hydraulic pressure command value as to perform about 70% of the whole piston stroke during predetermined time period T1. The output of the high hydraulic pressure command value serves as the control for completing piston stroke of the friction element as early as possible. The high hydraulic pressure command value is obtained as a sum of predetermined hydraulic pressure value PA1 and a value of a learning amount. The value of the learning amount is corrected in sequence on the basis of a time until an inertia phase and a rate of change thereof.

The hydraulic pressure command value (PA2+the value of the learning amount) transmitted by the first hydraulic pressure value transmitting section is outputted from time t1. At time t2 at which predetermined time period T1 has elapsed from time t1, only the hydraulic pressure value transmitted by the first hydraulic pressure value transmitting section is outputted. That is, the high hydraulic pressure command value (PA1+the value of the learning amount) transmitted by the second hydraulic pressure value transmitting section is outputted until time t2, and the high hydraulic pressure command value is decreased at time t2. After completion of the output of the high hydraulic pressure command value, a hydraulic pressure command value having predetermined gradient RA1 which is as low as being maintainable and allows slow progress of the piston stroke is set in advance of engagement. As described above, the computation of the hydraulic pressure command value by the first hydraulic pressure value transmitting section is carried out from time t1 with an initial value (PA2+the value of the learning amount) and predetermined gradient RA1.

In this case, predetermined gradient RA1 is set depending upon rise of actual hydraulic pressure after finish of the piston stroke control, variation in the piston stroke and the like. Further, the shift control proceeds in the release-side friction element as explained later upon power-on downshift, whereas the shift control proceeds in the engagement-side friction element upon power-off downshift. Therefore, predetermined gradient RA1 is set to a small value upon the power-on downshift as compared with power-off downshift.

The piston stroke of the engagement-side friction element is gradually started in accordance with the hydraulic pressure command value as described above. When predetermined time period T2 has elapsed from the start of the piston stroke control or actual gear ratio GR has reached predetermined gear ratio GR6 that is larger than inertia phase start gear ratio GR1 and smaller than inertia phase end gear ratio GR3, the piston stroke control is terminated (step S102 in FIG. 5).

On the other hand, undershoot prevention control (step S201 shown in FIG. 5) for the release-side friction element is conducted. Specifically, when the downshift is started, the hydraulic pressure command value for the release-side friction element is reduced to predetermined hydraulic pressure command value TR2 that is set according to input torque. At this time, in order to inhibit excessive reduction (i.e., undershoot) of the hydraulic pressure, a hydraulic pressure command value (+TR1) higher than predetermined hydraulic pressure command value TR2 to a certain extent is outputted at the start of the downshift, and after that, the hydraulic pressure command value is gradually reduced to predetermined hydraulic pressure command value TR2 as a target value during predetermined time period T14 from the start of the downshift (see step S201 and step S202 in FIG. 5).

Upon the power-on downshift, predetermined hydraulic pressure command value TR2 corresponds to the hydraulic pressure at which the inertia phase is started upon the power-on downshift and a clutch as the release-side friction element begins to slightly slip. In contrast, upon the power-off downshift, predetermined hydraulic pressure command value TR2 corresponds to a hydraulic pressure at which the clutch as the release-side friction element is not slipped.

When predetermined time period T14 has elapsed, changeover control is conducted (step S203 in FIG. 5). The changeover control includes reducing the hydraulic pressure command value with predetermined gradient RR2 and maintaining this hydraulic pressure-reduced state until the inertia phase is started. The changeover control is continued until actual gear ratio GR reaches predetermined gear ratio GR1 at time t4 (step S204 in FIG. 5). Predetermined gear ratio GR1 represents start of the inertia phase.

At time t4 at which actual gear ratio GR has reached predetermined gear ratio GR1, inertia phase control is started (step S207 in FIG. 5). Under the inertia phase control, engagement pressure control for the release-side friction element is carried out by feedback control such that the progress of the inertia phase corresponds to a target rate of change of gear ratio. At time t6 at which actual gear ratio GR has reached predetermined gear ratio GR3 close to a gear ratio at which n−1 speed is established, the inertia phase control is terminated (step S208 in FIG. 5).

At time t5 at which actual gear ratio GR has reached predetermined gear ratio GR6 set before the above-described predetermined gear ratio GR3 (or at which a backup timer has counted predetermined time period T2), the piston stroke control for the engagement-side friction element is terminated (step S102 in FIG. 5). The piston stroke control is continued until time t5 or the lapse of predetermined time period T2.

Subsequently, MAX pressure achievement control for the engagement-side friction element is conducted (step S103 in FIG. 5). Under the MAX pressure achievement control, the hydraulic pressure in the engagement-side friction element is increased to predetermined hydraulic pressure TA14 that is set on the basis of the input torque, until elapsed time T reaches predetermined time period T12. Predetermined hydraulic pressure TA14 is a hydraulic pressure that allows n speed to be surely established, serving for suppressing occurrence of shift shock due to dispersion in detection of the inertia phase termination.

At time t7 at which predetermined time period T12 has elapsed, the hydraulic pressure command value (duty) for the engagement-side friction element is set to 100% and a maximum value of the hydraulic pressure (i.e., a MAX pressure) is outputted. Then, the downshift for the engagement-side friction element is terminated. On the other hand, when the inertia phase control for the release-side friction element is terminated at time t6, pressure drop gradient control is conducted (step S209 in FIG. 5). The pressure drop gradient control that is performed when the termination of the inertia phase control is determined at time t6, includes reducing the hydraulic pressure in the release-side friction element with predetermined gradient RR4 corresponding to the input torque such that torque fluctuation in the output shaft can be suppressed and the hydraulic pressure can be quickly dropped to a minimum value of the hydraulic pressure (i.e., a MIN pressure), that is, zero.

At time t8 at which predetermined time period T8 has elapsed from the reduction of the hydraulic pressure with predetermined gradient RR4, the hydraulic pressure command value (duty) for the release-side friction element is set to 0% and the minimum value of the hydraulic pressure (i.e., the MIN pressure=zero) is outputted (step S210 in FIG. 5). Then, the downshift for the release-side friction element is terminated. For instance, upon downshift from 5th speed to 4th speed, when the hydraulic pressure command value (duty) for the release-side friction element is set to 0% and the minimum value of the hydraulic pressure (i.e., the MIN pressure=zero) is outputted, solenoid 51 is switched from the OFF position to the ON position. Therefore, when zero of the hydraulic pressure is outputted, first selector valve 40 is placed in the position where the hydraulic pressure supply to input clutch C1 is blocked and the hydraulic pressure supply to low brake B2 is allowed. The normal downshift control operation is performed as described above.

[Downshift Control Operation Upon Sequential Shift]

Figure 6:
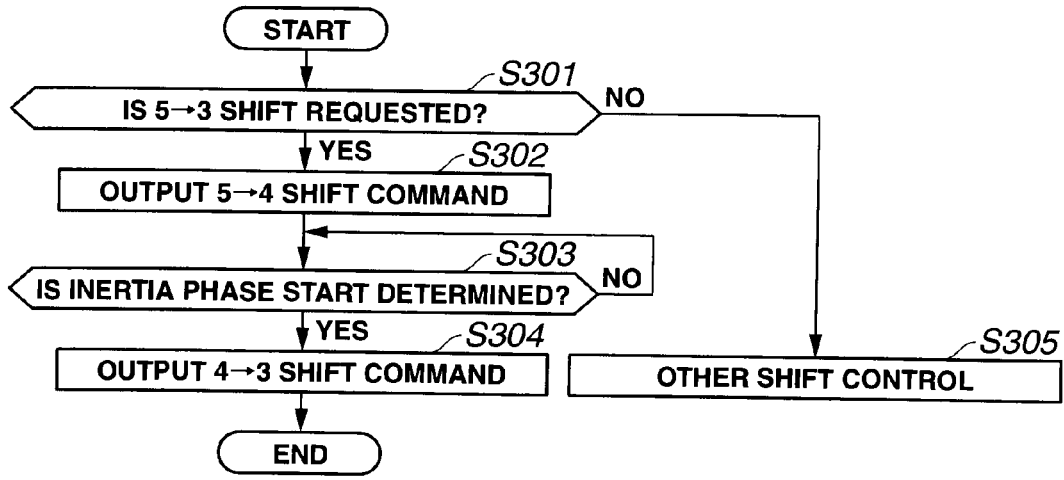
FIG. 6 is a flowchart showing sequential shift control in the embodiment.
Figure 7:
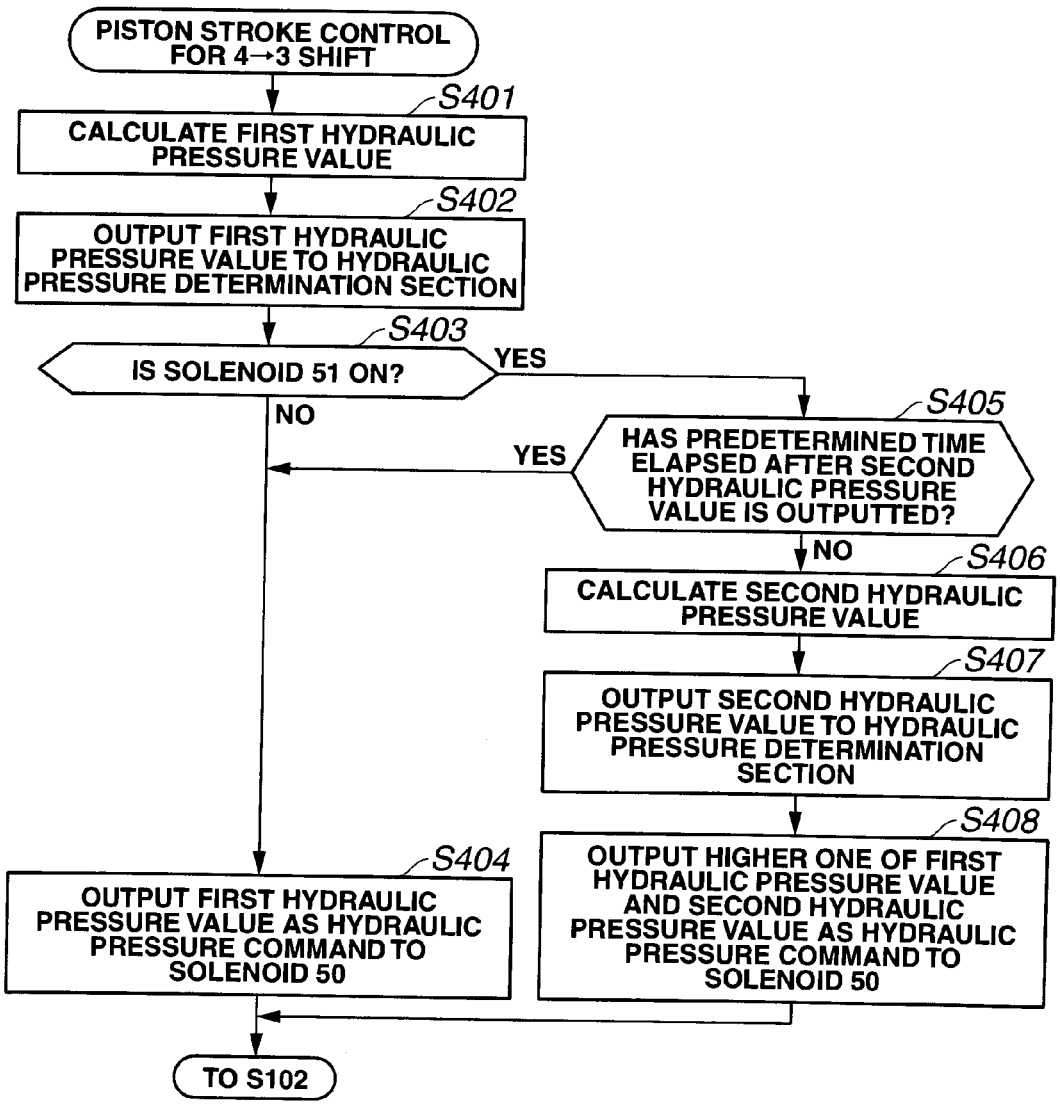
FIG. 7 is a flowchart showing piston stroke control for an engagement-side friction element upon executing a shift command to perform shift from 4th speed to 3rd speed under the sequential shift control in the embodiment.
Figure 8:
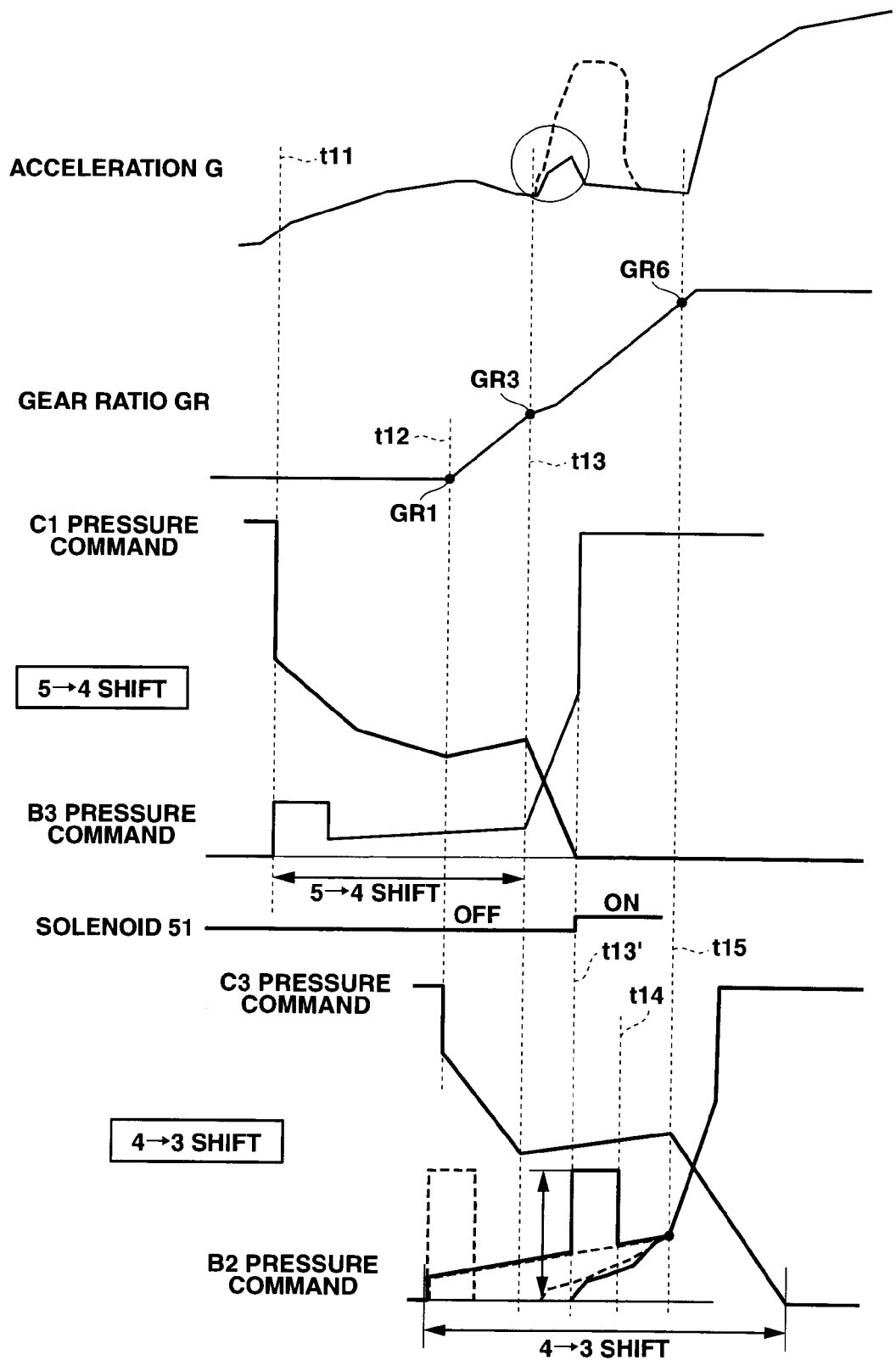
FIG. 8 is a time chart showing the sequential shift control in the embodiment.

Referring to FIG. 6 to FIG. 8, downshift control upon sequential shift is explained. FIG. 6 is a flowchart showing a sequential shift control operation in this embodiment. The sequential shift means that for instance, downshift from 4th speed to 3rd speed (i.e., second shift) is performed before downshift from 5th speed to 4th speed (i.e., first shift) is completed. Specifically, the sequential shift involves the case where it is determined that execution of the downshift from 4th speed to 3rd speed is necessitated due to change in the vehicle running condition during execution of the downshift from 5th speed to 4th speed. Further, the sequential shift involves the case where downshift from 5th speed to 3rd speed is determined at the moment of initial shift determination. That is, the sequential shift involves the case where ATCU 20 determines to execute the downshift from 4th speed to 3rd speed during execution of the downshift from 5th speed to 4th speed, before executing the downshift from 5th speed to 4th speed.

In a case where the sequential shift described above is not performed, the downshift from 5th speed to 4th speed is carried out to establish 4th speed, and subsequently, the downshift from 4th speed to 3rd speed is carried out. At this time, there occurs variation in acceleration G as indicated by a waveform dotted line in FIG. 8. After acceleration G corresponding to the established 4th speed is generated owing to the establishment of 4th speed, acceleration G is dropped as the downshift to 3rd speed is started. When 3rd speed is established, acceleration G is increased again. In order to avoid the variation in acceleration G, the sequential shift in which the downshift to 3rd speed is started during execution of the downshift from 5th speed to 4th speed. For instance, when downshift to 3rd speed is determined during the vehicle running at 5th speed, the sequential shift control operation shown in the flowchart of FIG. 6 is performed.

Logic flow starts and goes to step S301 where a determination as to whether sequential shift from 5th speed to 3rd speed is requested is made. When the answer to step S301 is YES indicative that the sequential shift from 5th speed to 3rd speed is requested, the logic flow proceeds to step S302. When the answer to step S301 is NO, the logic flow proceeds to step S305 where other shift control, such as normal downshift from 5th speed to 4th speed, is performed.

In step S302, a shift command to perform downshift from 5th speed to 4th speed is outputted (as first shift). This shift control is the same as that explained in the above-described normal downshift control operation.

In step S303, a determination as to whether actual gear ratio GR has reached predetermined gear ratio GR1 as a reference for determining start of the inertia phase is made. In this embodiment, predetermined gear ratio GR1 has a value that is offset from a value of the gear ratio at 5th speed slightly closer to a value of the gear ratio at 4th speed. When the answer to step S303 is YES indicative of the start of the inertia phase upon the first shift, the logic flow proceeds to step S304. When the answer to step S303 is NO, a standby state is kept until the inertia phase is started.

In step S304, a shift command to perform downshift from 4th speed to 3rd speed is outputted (as second shift). The downshift control for the release-side friction element upon the sequential shift is the same as that explained in the above-described normal power-on downshift control. The downshift control for the engagement-side friction element, specifically, the piston stroke control for the engagement- side friction element, upon the sequential shift differs from that explained in the above-described normal power-on downshift control. The piston stroke control for the engagement-side friction element upon the sequential shift will be explained hereinafter.

[Piston Stroke Control in Sequential Shift]

FIG. 7 is a flowchart showing the piston stroke control for the engagement-side friction element which is performed when the downshift command from 4th speed to 3rd speed is carried out, in the sequential shift control operation.

In step S401, a first hydraulic pressure value is calculated by the following equation, i.e., predetermined hydraulic pressure value PA2+a value of the learning amount+predetermined gradient RA1×elapsed time from start of the piston stroke control. The elapsed time from start of the piston stroke control is an elapsed time from the moment at which reduction of the hydraulic pressure in H&RL clutch C3 serving as the release-side friction element upon the second shift is started.

In step S402, the first hydraulic pressure value calculated is outputted to hydraulic pressure determination section 20a that determines a final hydraulic pressure command.

In step S403, a determination as to whether solenoid 51 is placed in the ON position is made. When the answer to step S403 is NO indicative that solenoid 51 is placed in the OFF position, the logic flow proceeds to step S404. When the answer to step S403 is YES indicative that solenoid 51 is placed in the ON position, the logic flow proceeds to step S405. In other words, even after actual gear ratio GR has reached gear ratio GR3, it is necessary to control the hydraulic pressure in input clutch C1. Therefore, solenoid 51 is switched from the OFF position to the ON position at the moment at which a pressure command to input clutch C1 serving as the release-side friction element upon the first shift becomes zero.

In step S404, the first hydraulic pressure value calculated in step S401, which is used as the final hydraulic pressure command to low brake B2, is outputted to solenoid 50. The logic flow then proceeds to step S102.

In step S405, a determination as to whether predetermined time period T1 has elapsed from the moment at which the output of the hydraulic pressure value by the second hydraulic pressure value transmitting section is started is made. When the answer to step S405 is YES indicative that predetermined time period T1 has elapsed, the logic flow then proceeds to step S404. When the answer to step S405 is NO indicative that predetermined time period T1 has not elapsed, the logic flow then proceeds to step S406. After the lapse of predetermined time period T1, the first hydraulic pressure value is always outputted to solenoid 50 by the first hydraulic pressure value transmitting section.

In step S406, a second hydraulic pressure value is calculated by the second hydraulic pressure value transmitting section. Specifically, a sum of predetermined hydraulic pressure value PA1 and a value of the learning amount is calculated.

In step S407, the second hydraulic pressure value calculated is outputted to hydraulic pressure determination section 20a that determines a final hydraulic pressure command.

In step S408, either one of the first hydraulic pressure value and the second hydraulic pressure value which is higher than the other, which is used as a final hydraulic pressure command to low brake B2, is outputted to solenoid 50. That is, in step S408, a higher hydraulic pressure value is determined as the final hydraulic pressure command by comparing the first hydraulic pressure value and the second hydraulic pressure value with each other, and the final hydraulic pressure command is outputted to solenoid 50. The logic flow then proceeds to step S102.

Referring to FIG. 8, an operation of the sequential shift control in the embodiment will be explained hereinafter. FIG. 8 is a time chart showing the sequential shift control in the embodiment.

At time t11 at which the shift command to shift from 5th speed to 4th speed is outputted, a downshift operation for the shift is performed. The downshift operation is the same as the above-described normal downshift control operation, and therefore, detailed explanations therefore are omitted.

For instance, under a condition that the accelerator pedal is strongly depressed by the vehicle driver and 3rd speed is determined as the final target speed, if downshift from 5th speed to 3rd speed is conducted, there will occur a so-called double changeover in which input clutch C1 and H&RL clutch C3 are simultaneously brought into release and low brake B2 and 2346-brake B3 are simultaneously brought into engagement. This results in complicating the shift control and causing difficulty in ensuring quality of the shift control.

On the other hand, under the above condition, if downshift to 3rd speed is started after downshift from 5th speed to 4th speed is completed, a total shift time will be increased contrary to the vehicle driver's intention. Therefore, when it is determined that the inertia phase upon the downshift from 5th speed to 4th speed is started, a downshift command to shift from 4th speed to 3rd speed is outputted to start the control necessary to achieve 3rd speed. That is, the sequential shift operation is performed.

Specifically, at time t12 at which it is determined that actual gear ratio GR has reached predetermined gear ratio GR1 representing start of the inertia phase upon the downshift from 5th speed to 4th speed, the downshift control for shifting from 4th speed to 3rd speed is started. Specifically, release control for H&RL clutch C3 is started, and at the same time, engagement control for low brake B2 is started.

Here, it is noted that even when the release control for H&RL clutch C3 is performed at the moment of start of the inertia phase upon the downshift from 5th speed to 4th speed, good response in hydraulic pressure can be obtained and H&RL clutch C3 can be controlled in desired capacity to thereby cause no problem. Further, if the downshift to 3rd speed is started at the moment of completion of the downshift from 5th speed to 4th speed, changeover of first selector valve 40 to the ON position has been already terminated to thereby cause no problem about the hydraulic pressure supply to low brake B2.

However, in order to suppress variation in acceleration G by the sequential shift, it is necessary to start the downshift to 3rd speed in advance of completion of the downshift from 5th speed to 4th speed. As described above, first selector valve 40 is provided in the hydraulic circuit of low brake B2 in view of avoiding interlock between low brake B2 and input clutch C1. With the arrangement of first selector valve 40, even when a hydraulic pressure supply command to low brake B2 is outputted, the hydraulic pressure is supplied to only the drain passage so that first hydraulic pressure chamber 37 of low brake B2 cannot be substantially supplied with the hydraulic pressure.

Particularly, in a case where the piston stroke control for low brake B2 cannot be appropriately performed, timing in actually producing engagement capacity of low brake B2 is delayed with respect to H&RL clutch C3 to thereby cause engine idle revving after termination of inertia phase.

In view of the above problems, in the embodiment, the ON and OFF positions of solenoid 51 which indicate the operating positions of first selector valve 40 are determined, and after it is determined that solenoid 51 is placed in the ON position (that is, after it is determined that the hydraulic pressure supply to low brake B2 is allowable), the second hydraulic pressure value transmitting section transmits the hydraulic pressure value under the piston stroke control.

At time t12 at which the engagement control for low brake B2 is started simultaneously with the start of the release control of H&RL clutch C3, the first hydraulic pressure value transmitting section starts to output the first hydraulic pressure value. Even when the first hydraulic pressure value is outputted at this timing, first hydraulic pressure chamber 37 of low brake B2 is prevented from being supplied with the hydraulic pressure by the above-described operation of first selector valve 40.

At time t13 at which actual gear ratio GR has reached predetermined gear ratio GR3 that represents termination of the inertia phase upon the downshift from 5th speed to 4th speed, the hydraulic pressure in input clutch C1 is rapidly reduced with a predetermined gradient.

At time t13' at which a hydraulic pressure command for input clutch C1 (i.e., C1 pressure command) becomes zero, solenoid 51 is switched from the OFF position to the ON position to thereby perform changeover of first selector valve 40 to the first position. At this time, the second hydraulic pressure value transmitting section starts to output the second hydraulic pressure value. Since the higher one of the first hydraulic pressure value and the second hydraulic pressure value is outputted as the hydraulic pressure command to solenoid 50, the high hydraulic pressure value (predetermined hydraulic pressure value PA1+a value of the learning amount) is outputted until a lapse of predetermined time period T1 from time t13'. As a result, the piston stroke can be surely carried out before termination of the inertia phase upon the downshift from 4th speed to 3rd speed.

At time t14 at which predetermined time period T1 has elapsed from the start of outputting the second hydraulic pressure value as the hydraulic pressure command to solenoid 50, the first hydraulic pressure value is selected as the hydraulic pressure command. The first hydraulic pressure value is continuously computed from the time at which the downshift command to shift from 4th speed to 3rd speed is outputted. The first hydraulic pressure value has predetermined gradient RA1 that is set so as to increase with the lapse of time. In other words, the first hydraulic pressure value (i.e., an initial value of the first hydraulic pressure value that is substantially provided) which is outputted immediately after completion of outputting of the second hydraulic pressure value as the hydraulic pressure command, is set to a value that is calculated corresponding to a degree of progress of reduction of the hydraulic pressure in H&RL clutch C3. Accordingly, as compared to a case where computation of the first hydraulic pressure value is started at time t14, it is possible to ensure a higher hydraulic pressure value and thereby further facilitate the piston stroke.

At time t15 at which it is determined that actual gear ratio GR has reached predetermined gear ratio GR6 that represents termination of the inertia phase upon the downshift from 4th speed to 3rd speed, H&RL clutch C3 is brought into the completely release state whereas low brake B2 is brought into the completely engagement state by performing the MAX pressure achievement control. Thus, the downshift from 4th speed to 3rd speed is completed.

Figure 9:
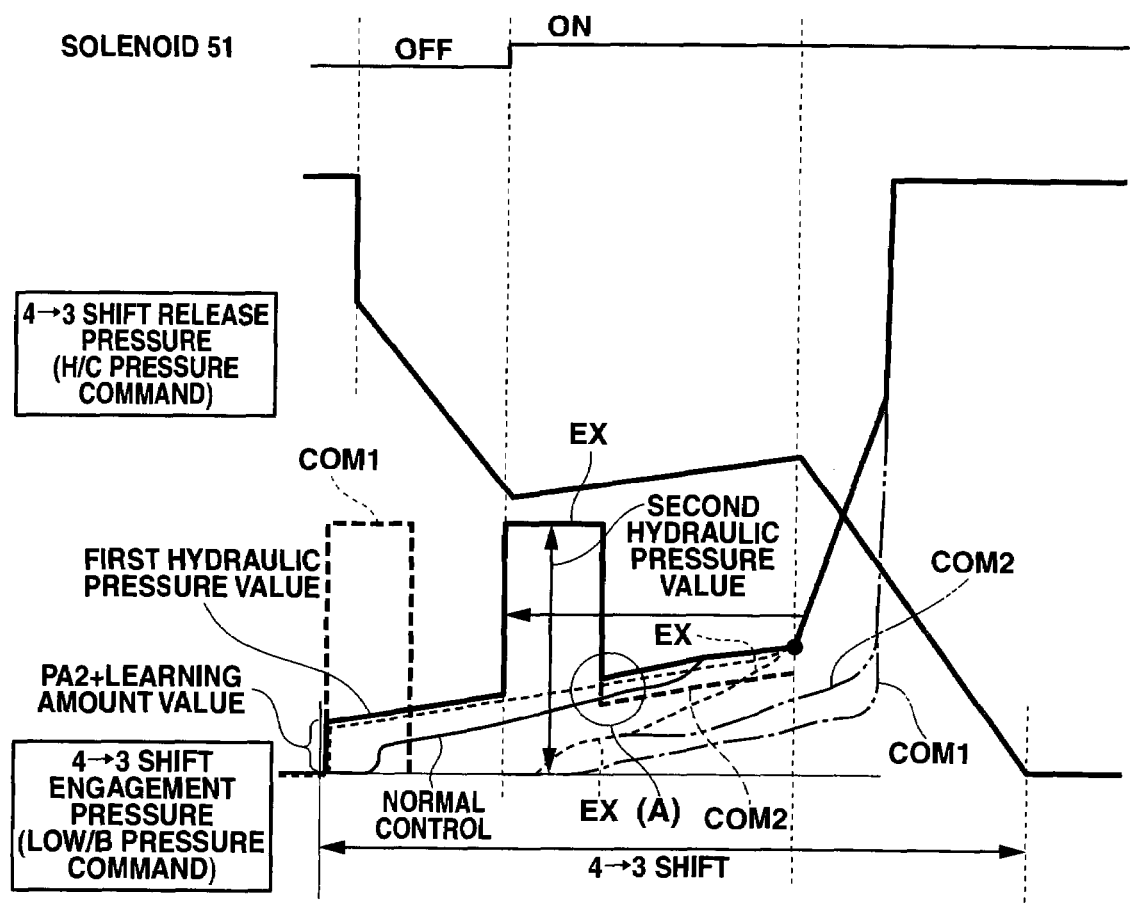
FIG. 9 is an enlarged time chart showing downshift from 4th speed to 3rd speed under the sequential shift control in an example according to the embodiment in comparison with comparative examples.

Referring to FIG. 9, the operation of the downshift from 4th speed to 3rd speed under the sequential shift control in Example according to this embodiment is explained in more detail on the basis of comparison with the operation of the downshift from 4th speed to 3rd speed in Comparative Examples 1 and 2. FIG. 9 is an enlarged time chart of the time chart showing the downshift from 4th speed to 3rd speed. In FIG. 9, thin solid line denotes a rise in hydraulic pressure upon the normal downshift control, thin dotted line denotes a rise in hydraulic pressure under the sequential shift control in Example (EX) according to the embodiment, thin alternate long and short dash line denotes a rise in hydraulic pressure in Comparative Example 1 (COM1), and thin two-dot chain line denotes a rise in hydraulic pressure in Comparative Example 2 (COM2).

OPERATION OF COMPARATIVE EXAMPLE 1

In Comparative Example 1 (COM1), piston stroke control is started simultaneously with output of the downshift command to shift from 4th speed to 3rd speed, so that the second hydraulic pressure value (i.e., a high hydraulic pressure value) as the hydraulic pressure command to solenoid 50 is outputted at the beginning. In this case, since solenoid 51 is in the OFF position, even though the second hydraulic pressure value is outputted, the hydraulic pressure flows into the drain passage and does not serve for the piston stroke. Even when solenoid 51 is in the ON position, only the first hydraulic pressure value is outputted. Therefore, a rise in actual hydraulic pressure is very small. When a hydraulic pressure for complete engagement is supplied under the MAX pressure achievement control subsequent to the piston stroke control, there will occur engine idle revving due to lack of the capacity of low brake B2, and after that, shock will be caused due to abrupt drop in engine speed which is generated due to rapid change from a low hydraulic pressure to a high hydraulic pressure.

OPERATION OF COMPARATIVE EXAMPLE 2

Next, an operation of Comparative Example 2 (COM2) is explained. In Comparative Example 2 (COM2), the piston stroke control is started only after solenoid 51 is placed in the ON position. In this case, since the second hydraulic pressure value is outputted to thereby supply the hydraulic pressure to low brake B2, the piston stroke corresponding to the hydraulic pressure can be obtained. However, computation of the first hydraulic pressure value is started after solenoid 51 is placed in the ON position. Therefore, a hydraulic pressure value lower than that in Example (EX) is computed as the first hydraulic pressure value as shown in region A in FIG. 9, so that a sufficient amount of the piston stroke cannot be ensured. Accordingly, although Comparative Example 2 (COM2) is improved as compared to Comparative Example 1 (COM1), there will occur the same problems as those in Comparative Example 1 (COM1).

OPERATION OF EXAMPLE (EX) ACCORDING TO THE EMBODIMENT

In contrast to Comparative Example 1 (COM1) and Comparative Example 2 (COM2), in Example (EX) according to the embodiment, only after solenoid 51 is placed in the ON position where hydraulic pressure supply to low brake B2 is allowable, the second hydraulic pressure value is transmitted and used as the hydraulic pressure command to solenoid 50. Therefore, a large amount of the hydraulic fluid flow which can facilitate the piston stroke can be supplied to low brake B2. In addition, regardless of the operating position of solenoid 51, the first hydraulic pressure value is transmitted, in other words, computation of the first hydraulic pressure value is continued from the moment at which the downshift from 4th speed to 3rd speed is started. Accordingly, when transmission and outputting of the second hydraulic pressure value is terminated, there can be provided a relatively high hydraulic pressure that corresponds to a degree of reduction of the hydraulic pressure in H&RL clutch C3 (that is, a degree of progress of the downshift operation). As a result, the piston stroke can be completed before the moment at which the inertia phase is terminated. Further, it is possible to avoid occurrence of escape feeling of acceleration G due to lack of the engagement force of low brake B2 and suppress shift shock by accurately performing the MAX pressure achievement control.

As explained above, the embodiment can attain the following function and effect.

(1) The hydraulic control apparatus for an automatic transmission, according to the embodiment, includes pressure regulator valve 39, first selector valve 40 and solenoid 51. Pressure regulator valve 39 regulates a hydraulic fluid pressure which is supplied to low brake B2 (i.e., the second friction element). First selector valve 40 is switchable between a first position where fluid communication between pressure regulator valve 39 and low brake B2 is allowed, and a second position where the fluid communication therebetween is blocked. Solenoid 51 serving as a switch member is operative to switch first selector valve 40 to the second position when a hydraulic fluid pressure is generated in input clutch C1 (i.e., the first friction element), and switch first selector valve 40 to the first position when the hydraulic pressure to input clutch C1 is not generated. The hydraulic control apparatus further includes a determination section (i.e., step S403) which determines that first selector valve 40 is switched from the second position to the first position where the fluid communication between pressure regulator valve 39 and low brake B2 is allowed, and a sequential shift control section that performs sequential shift control in a case where it is necessary to execute shift from 4th speed to 3rd speed (i.e., second shift) during execution of shift from 5th speed to 4th speed (i.e., first shift). The sequential shift control includes starting reduction of the hydraulic fluid pressure in H&RL clutch C3 (i.e., a third friction element) when actual gear ratio GR (i.e., a parameter that varies in accordance with a degree of progress of the shift from 5th speed to 4th speed) has reached predetermined gear ratio GR1 (i.e., a predetermined value). The sequential shift control further includes performing piston stroke control that includes outputting a high hydraulic pressure command as a hydraulic fluid pressure to low brake B2 when first selector valve 40 is switched from the second position to the first position where the fluid communication between pressure regulator valve 39 and low brake B2 is allowed, and subsequent to termination of outputting the high hydraulic pressure command, outputting a low hydraulic pressure command lower than the high hydraulic pressure command.

Since the piston stroke control for low brake B2 is performed when first selector valve 40 is switched to the first position, a large amount of the hydraulic fluid flow can be surely supplied to low brake B2. As a result, it is possible to minimize a delay in rise of the engagement-side hydraulic fluid pressure with respect to a drop in the release-side hydraulic pressure. Further, the time that is required until the downshift to 3rd speed as the final target speed is completed can be shortened by starting the downshift from 4th speed to 3rd speed when actual gear ratio GR has reached predetermined gear ratio GR1 representing start of the inertia phase.

(2) The first hydraulic pressure value (i.e., an initial value of the low hydraulic pressure command) which is outputted immediately after completion of outputting of the second hydraulic pressure value (i.e., the high hydraulic pressure command), is set to a value that is calculated corresponding to a degree of progress of reduction of the hydraulic fluid pressure in H&RL clutch C3. That is, the hydraulic pressure higher than the hydraulic pressure that will be supplied upon the normal single downshift can be supplied to low brake B2 since the first hydraulic pressure value to be outputted immediately after the second hydraulic pressure value is set in accordance with the degree of progress of reduction of the hydraulic fluid pressure in H&RL clutch C3 on the release side. As a result, it is possible to minimize a delay in rise of the hydraulic fluid pressure in low brake B2 with respect to drop of the hydraulic fluid pressure in H&RL clutch C3 on the release side and suppress occurrence of engine idle revving during the shift operation.

(3) The hydraulic control apparatus further includes a first hydraulic pressure value transmitting section, a second hydraulic pressure value transmitting section, an actuation section (i.e., step S406 and step S407) and a hydraulic pressure control section (i.e., step S408). The first hydraulic pressure value transmitting section transmits the first hydraulic pressure value that is increased corresponding to a time elapsed from start of the inertial phase upon the downshift from 5th speed to 4th speed (i.e., from start of reduction of the hydraulic pressure in H&RL clutch C3 serving as the release-side friction element upon the downshift from 4th speed to 3rd speed). The second hydraulic pressure value transmitting section transmits the high hydraulic pressure command as the second hydraulic pressure value during the predetermined time period. The actuation section actuates the second hydraulic pressure value transmitting section when first selector valve 40 is switched from the second position to the first position. The hydraulic pressure control section outputs either one of the first hydraulic pressure value and the second hydraulic pressure value which is higher than the other, as a final hydraulic pressure command to low brake B2.

Since the first hydraulic pressure value transmitted by the first hydraulic pressure value transmitting section which is increased corresponding to the time elapsed from start of the inertia phase is outputted as the hydraulic pressure command to low brake B2 after outputting of the high hydraulic pressure value during the predetermined time period is terminated, it is possible to ensure a relatively high hydraulic pressure corresponding to the degree of progress of the shift operation. As a result, the piston stroke condition of the engagement-side friction element and the release condition of the release-side friction element can be well matched with each other to thereby minimize a delay in rise of the hydraulic fluid pressure in low brake B2 with respect to drop of the hydraulic fluid pressure in H&RL clutch C3 on the release side and reduce occurrence of shock to a minimum.

This application is based on a prior Japanese Patent Application No. 2008-152365 filed on Jun. 11, 2008. The entire contents of the Japanese Patent Application No. 2008-152365 is hereby incorporated by reference.

Although the invention has been described above by reference to a certain embodiment of the invention, the invention is not limited to the embodiment described above. Modifications and variations of the embodiment described above will occur to those skilled in the art in light of the above teachings. The scope of the invention is defined with reference to the following claims.

What is claimed is:

1. A hydraulic control apparatus for an automatic transmission that includes a planetary gear set and a plurality of friction elements and establishes a plurality of speeds by changeover of the plurality of friction elements between engagement and release, the plurality of friction elements including a first friction element that is brought into a release state upon first shift, a second friction element that is in a release state upon the first shift but is brought into an engagement state upon second shift, and a third friction element that is brought into a release state upon the second shift, the hydraulic control apparatus comprising:
   a pressure regulator valve regulating a hydraulic fluid pressure that is supplied to the second friction element;
   a selector valve that is switchable between a first position where fluid communication between the pressure regulator valve and the second friction element is allowed, and a second position where the fluid communication between the pressure regulator valve and the second friction element is blocked;
   a switch means for switching the selector valve to the second position when the first friction element is in the engagement state, and switching the selector valve to the first position when the first friction element is in the release state; and
   a sequential shift control means for performing sequential shift control in a case where it is necessary to execute the second shift during execution of the first shift,
   the sequential shift control including:
      starting reduction of hydraulic fluid pressure in the third friction element when a parameter that varies in accordance with a degree of progress of the first shift has reached a predetermined value, and
      performing piston stroke control that includes outputting a high hydraulic pressure command as a hydraulic fluid pressure to the second friction element when the selector valve is switched from the second position to the first position, and subsequent to completion of outputting of the high hydraulic pressure command, outputting a low hydraulic pressure command that is lower than the high hydraulic pressure command.

2. The hydraulic control apparatus as claimed in claim 1, wherein an initial value of the low hydraulic pressure command which is outputted immediately after the completion of outputting of the high hydraulic pressure command is set to a value that is calculated corresponding to a degree of progress of the reduction of the hydraulic fluid pressure in the third friction element.

3. The hydraulic control apparatus as claimed in claim 2, further comprising:
   a first hydraulic pressure value transmitting means for transmitting a first hydraulic pressure value that is increased corresponding to an elapsed time from start of the second shift;
   a second hydraulic pressure value transmitting means for transmitting a second hydraulic pressure value as the high hydraulic pressure command during a predetermined time period;
   an actuation means for actuating the second hydraulic pressure value transmitting means when the selector valve is switched from the second position to the first position; and
   a hydraulic pressure control means for outputting either one of the first hydraulic pressure value and the second hydraulic pressure value which is higher than the other, as a hydraulic pressure command to the second friction element.

4. The hydraulic control apparatus as claimed in claim 1, further comprising a determination means for determining that the selector valve is switched from the second position to the first position.

5. A method of controlling an automatic transmission that includes a planetary gear set, a plurality of friction elements and establishes a plurality of speeds by changeover of the plurality of friction elements between engagement and release, the plurality of friction elements including a first friction element that is brought into a release state upon first shift, a second friction element that is in a release state upon the first shift and is brought into an engagement state upon second shift, and a third friction element that is brought into a release state upon the second shift, a pressure regulator valve regulating a hydraulic fluid pressure that is supplied to the second friction element, a selector valve that is switchable between a first position where fluid communication between the pressure regulator valve and the second friction element is allowed, and a second position where the fluid communication between the pressure regulator valve and the second friction element is blocked, and a switch means for switching the selector valve to the second position when the first friction element is in the engagement state, and switching the selector valve to the first position when the first friction element is in the release state, the method comprising:

in a case where it is necessary to execute the second shift during execution of the first shift, starting reduction of hydraulic fluid pressure in the third friction element when a parameter that varies in accordance with a degree of progress of the first shift has reached a predetermined value;

outputting a high hydraulic pressure command as a hydraulic fluid pressure to the second friction element when the selector valve is switched from the second position to the first position; and subsequent to completion of outputting of the high hydraulic pressure command, outputting a low hydraulic pressure command that is lower than the high hydraulic pressure command.

6. The method as claimed in claim 5, wherein an initial value of the low hydraulic pressure command which is outputted immediately after the completion of outputting of the high hydraulic pressure command is set to a value that is calculated corresponding to a degree of progress of the reduction of the hydraulic fluid pressure in the third friction element.

7. The method as claimed in claim 5, wherein the low hydraulic pressure command is increased corresponding to an elapsed time from start of the second shift.

8. The method as claimed in claim 5, further comprising outputting the low hydraulic pressure command until the selector valve is switched from the second position to the first position.

9. The method as claimed in claim 5, further comprising determining that a predetermined time period has elapsed from a moment at which outputting of the high hydraulic pressure command is started.

10. The method as claimed in claim 5, further comprising determining that the selector valve is switched from the second position to the first position.

* * * * *